United States Patent
Bailey et al.

(10) Patent No.: US 9,442,746 B2
(45) Date of Patent: *Sep. 13, 2016

(54) COMMON SYSTEM SERVICES FOR MANAGING CONFIGURATION AND OTHER RUNTIME SETTINGS OF APPLICATIONS

(71) Applicant: International Business Machines Corporation, Armonk, NY (US)

(72) Inventors: Kimberly T. Bailey, Raleigh, NC (US); Thomas K. McCarthy, Durham, NC (US); Michael W. Stayton, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/825,135

(22) Filed: Aug. 12, 2015

(65) Prior Publication Data

US 2015/0370581 A1    Dec. 24, 2015

Related U.S. Application Data

(63) Continuation of application No. 14/308,061, filed on Jun. 18, 2014.

(51) Int. Cl.
  *G06F 9/445*    (2006.01)
  *G06F 9/54*    (2006.01)
  *G06F 9/46*    (2006.01)
(52) U.S. Cl.
  CPC .......... *G06F 9/44505* (2013.01); *G06F 9/461* (2013.01); *G06F 9/54* (2013.01)
(58) Field of Classification Search
  None
  See application file for complete search history.

(56) References Cited

U.S. PATENT DOCUMENTS

| 7,127,526 | B1 | 10/2006 | Duncan et al. |
| 2002/0173984 | A1 | 11/2002 | Robertson et al. |
| 2005/0114870 | A1* | 5/2005 | Song ................ G06F 21/52 719/328 |
| 2008/0301691 | A1 | 12/2008 | Mamagkakis et al. |
| 2010/0205416 | A1* | 8/2010 | Lanner .............. G06F 9/44505 713/1 |
| 2013/0298243 | A1 | 11/2013 | Kumar et al. |
| 2015/0370598 | A1 | 12/2015 | Bailey et al. |

OTHER PUBLICATIONS

"Computational Registry Services," IP.com Prior Art Database Technical Disclosure No. IPCOM000131647D, Nov. 11, 2005, 3 pages.
"Method and System for Assigning Appropriate Run-Time Services to One or More Applications in an Enterprise," IP.com Prior Art Database Technical Disclosure No. IPCOM000200295D, Oct. 4, 2010, 3 pages.
Bailey et al., "Common Sense Services for Managing Configuration and Other Runtime Settings of Applications," U.S. Appl. No. 14/308,061, filed Jun. 18, 2014, 34 pages.
Office Action, dated Jul. 30, 2015, regarding U.S. Appl. No. 14/308,061, 25 pages.
Notice of Allowance, dated Apr. 12, 2016, regarding U.S. Appl. No. 14/308,061, 11 pages.
Final Office Action, dated Dec. 15, 2015, regarding U.S. Appl. No. 14/308,061, 29 pages.

* cited by examiner

*Primary Examiner* — Hang Pan
*Assistant Examiner* — Amir Soltanzadeh
(74) *Attorney, Agent, or Firm* — Yee & Associates, P.C.; Joseph Petrokaitis

(57) ABSTRACT

A method for managing settings of applications. A request from an application to store runtime settings currently being used by the application is identified. In response to identifying the request, the runtime settings are then stored on in a repository of runtime settings. In one or more examples, the application is running on an operating system on a computer system, and the request is communicated through a common system service of the operating system.

5 Claims, 5 Drawing Sheets

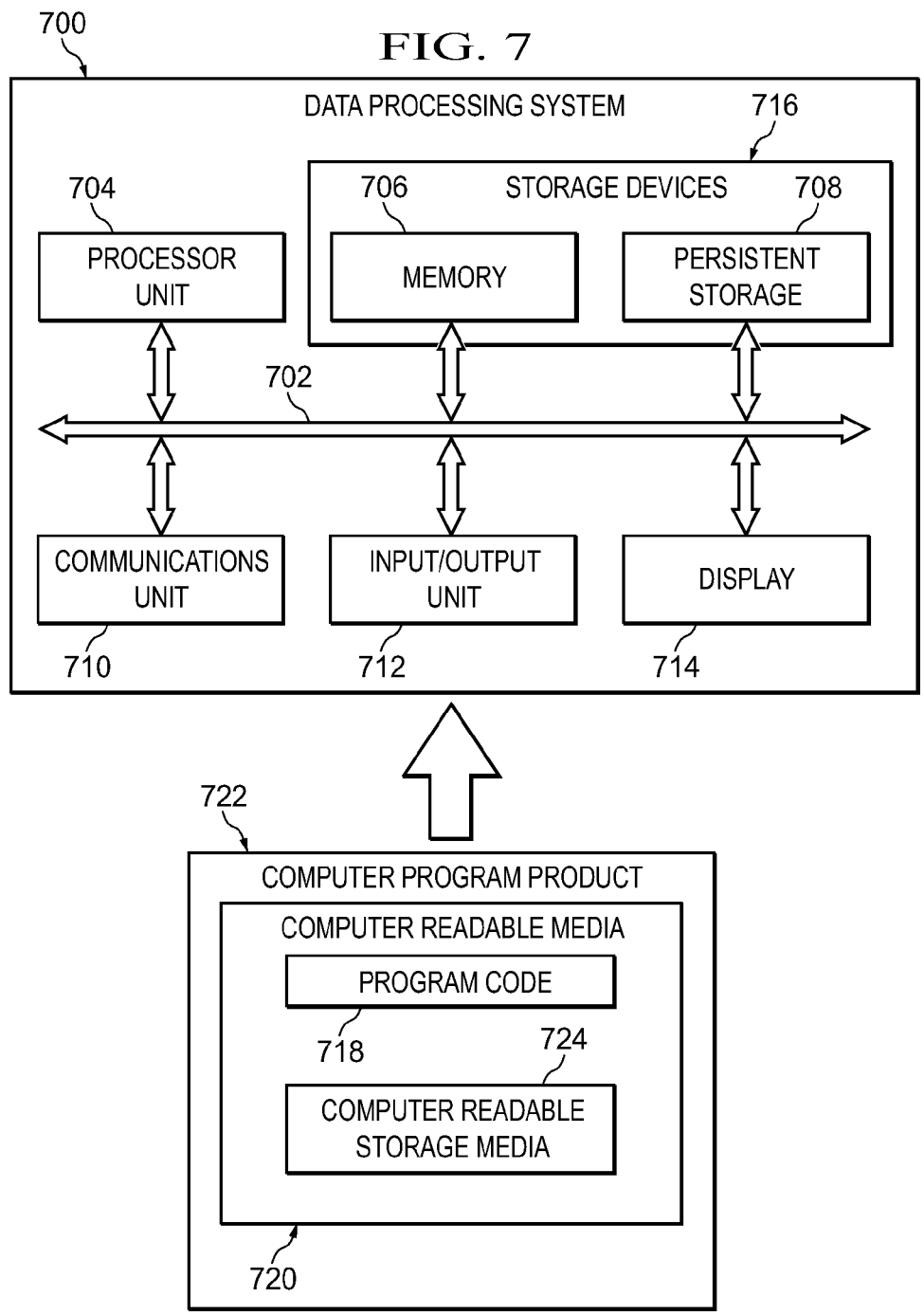

US 9,442,746 B2

COMMON SYSTEM SERVICES FOR MANAGING CONFIGURATION AND OTHER RUNTIME SETTINGS OF APPLICATIONS

CROSS-REFERENCE TO RELATED APPLICATION

This application is a continuation of and claims the benefit of priority to U.S. patent application Ser. No. 14/308,061, filing date Jun. 18, 2014, the entire contents of which are incorporated herein by reference.

BACKGROUND

1. Field

The disclosure relates generally to a data processing system and, in particular to managing applications. Still more particularly, the present disclosure relates to a method for managing configuration and other runtime settings of applications.

2. Description of the Related Art

Applications use settings to define preferred behaviors of the applications. These settings are typically stored as configuration information for the applications. The settings can be stored in configuration files, databases, and other types of storage. Storage of the settings is done on a wide range of storage devices. For example, an application may access settings in a configuration file on a storage device of a computer running the application. As another example, the application may also use a network between the computer running the application and a server computer to access settings at the server computer.

Settings of applications are modified by editing the configuration files. Users edit the settings in the configuration files to change some functionality of the applications. Applications also provide user interfaces to allow users easier access to the settings than manual editing of the configuration files. When an application starts up, the modified settings of the application are loaded from the application configuration file and the application then proceeds according to the modified settings. Some applications allow changes to the settings the application is currently using without having to restart the application. The settings being used by a running application are called runtime settings. When runtime settings of an application are modified, they need to be saved or they will become lost when the application restarts. The runtime settings may be saved on request, on each change, when the application is closed, and other suitable times. However, at any point in time there may be differences between runtime settings currently being used by the application and stored settings that will be used when the application is restarted.

Systems management and monitoring tools use configuration files of applications to determine if the applications are using correct or preferred settings. For example, a systems management tool may determine if an application is operating securely by evaluating security settings in a configuration file for the application. As another example, a monitoring tool may determine if an application is configured to perform optimally by evaluating performance related settings of the application. However, the locations where applications load settings can change over time with edits to configuration settings and with updates to the applications. When the locations change, the old configuration files may remain and the tools may not know which files to use. The format of the settings stored in configuration files may vary from application to application and from one version of an application to the next. When a new format is used the tools have to be updated to use the new format.

Additionally, some applications may use default values for settings not explicitly specified in configuration files. For example, a primary network used by an application may go down forcing the application to use default values for a backup network. In this example, the default values for the settings may be located in program instructions of the application rather than in settings in a configuration file. These default values may change over time with revisions to the applications and based on other factors that are not identifiable in configuration files.

Therefore, it would be desirable to have a method, apparatus, and computer program product that takes into account at least some of the issues discussed above.

SUMMARY

In one illustrative embodiment, a method, for managing settings of applications is disclosed. A request from an application to store runtime settings currently being used by the application is identified. The runtime settings are stored in a repository in response to identifying the request. In one or more examples, the application is running on an operating system on a computer system, and the request is communicated through a common system service of the operating system.

BRIEF DESCRIPTION OF THE SEVERAL VIEWS OF THE DRAWINGS

FIG. 7 is an illustration of a data processing system in accordance with an illustrative embodiment.

DETAILED DESCRIPTION

Figure 1:
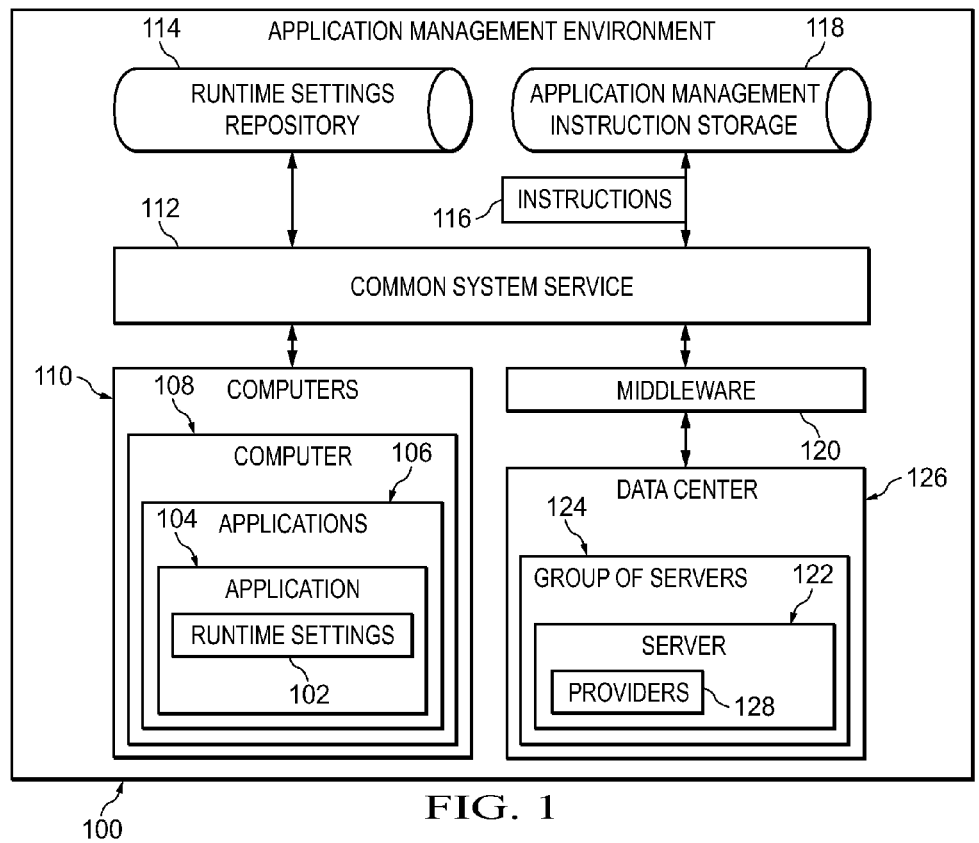
FIG. 1 is a block diagram of a data flow of a process for managing applications in an application management environment in accordance with an illustrative embodiment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that existing data processing systems ways to determine when an application is active on the data processing system. For example, local services may be available in a data processing system to obtain status for applications running in the data processing system.

The illustrative embodiments also recognize and take into account that existing applications change or modify settings used by the applications using configuration files. Tools are programmed to read these configuration files to identify settings being use by the applications.

The illustrative embodiments further recognize and take into account that some tools interact with an application to poll the application for settings being used by the application. For example, a service in an application may use system network management protocol (SNMP) to expose settings of the application.

With reference now to the figures and, in particular, with reference to FIG. 1, a block diagram of a data flow of a process for managing applications in an application management environment is depicted in accordance with an illustrative embodiment. Application management environment 100 is an illustrative example of an environment for managing runtime settings 102 of application 104. In these illustrative examples, runtime settings, such as runtime settings 102, are values specifying preferred behaviors of applications. In the illustrative example, runtime settings 102 may include at least one of networking protocol settings used by application 104 to communicate with remote data processing systems, display settings used by application 104 to present information, or any other suitable types of settings used by applications in application management environment 100.

As used herein, the phrase "at least one of", when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list but not all of the items in the list are required. As used herein, the phrase "a number of," when used with reference to items, means one or more items. For example, a "number of rules" is one or more rules.

In this illustrative example, application 104 is an example of an application in applications 106. Applications 106 are software programs configured to run on computer 108. Applications 106 may include at least one of client programs, server programs, middleware programs, or any other suitable type of computer programs. Applications 106 use program instructions to carry out operations based on runtime settings 102.

Computer 108 is an example of a computer in computers 110 in application management environment 100. Computers 110 may include at least one of personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and other computing environments that include any of the above systems or devices, and the like.

As depicted, common system service 112 manages runtime settings for applications 106 in computers 110. In this illustrative example, common system service 112 manages runtime settings 102 for application 104 in computer 108. In the illustrated example, application 104 is a consumer of common system service 112. As used herein, a consumer of a service is an application that uses the service as a client. Common system service 112 processes requests from application 104 to at least one of register application 104, de-register application 104, save runtime settings 102 and updates to runtime settings 102, retrieving runtime settings 102, subscribe to notifications about changes to runtime settings 102, or other suitable types of requests in application management environment 100.

Common system service 112 may use runtime settings repository 114 as storage for runtime settings 102. In this illustrative example, common system service 112 may store runtime settings 102 currently in use by application 104 in runtime settings repository 114. For example, common system service 112 may receive runtime settings 102 in a request sent from application 104 to store runtime settings 102. In this example, responsive to receiving the request, common system service 112 stores runtime settings 102 in runtime settings repository 114. Common system service 112 may also retrieve runtime settings 102 from runtime settings repository 114 for use by application 104. For example, common system service 112 may receive a request from application 104 for runtime settings 102. In this example, responsive to receiving the request, common system service 112 retrieves runtime settings 102 from runtime settings repository 114 and forwards runtime settings 102 to application 104.

In these illustrative examples, runtime settings repository 114 includes runtime settings such as runtime settings 102. For example, runtime settings repository 114 may be implemented using a computer readable storage device. As another example, runtime settings repository 114 may be at least one of an in memory buffer, a database or any other suitable storage for storage of runtime settings in application management environment 100. For example, runtime settings repository 114 may be a file in a computer readable storage device of a data processing system.

As depicted, common system service 112 manages applications 106 in computers 110. In this illustrative example, common system service 112 manages application 104 in computer 108. In the illustrated example, common system service 112 uses instructions 116 to manage application 104. Instructions 116 are rules for managing application 104 that are implemented by common system service 112. Instructions 116 are processed by common system service 112 to at least one of determine whether application 104 is using common system service 112 to manage runtime settings 102, terminate application 104 in response to determining application 104 is not using common system service 112 to manage runtime settings 102, start application 104 in response to determining application 104 is using common system service 112 to manage runtime settings 102, or other suitable types of instructions in application management environment 100.

Common system service 112 may use application management instruction storage 118 as a repository for instructions 116. In this illustrative example, common system service 112 may store instructions 116 currently in use by common system service 112 in application management instruction storage 118. For example, common system service 112 may receive instructions 116 in a request sent to common system service 112 to store instructions 116. In this example, responsive to receiving the request, common system service 112 stores instructions 116 in application management instruction storage 118. Common system service 112 may also retrieve instructions 116 from application management instruction storage 118 for use in managing application 104. For example, common system service 112 may use instructions 116 in a process to manage whether application 104 is terminated, started, or allowed to continue running in computer 108.

In these illustrative examples, application management instruction storage 118 includes instructions such as instructions 116. For example, application management instruction storage 118 may be implemented using a computer readable storage device. As another example, application management instruction storage 118 may be at least one of an in memory buffer, a database or any other suitable storage for storage of instructions in application management environment 100. For example, application management instruction storage 118 may be a file in a computer readable storage device of a data processing system.

As depicted, common system service 112 may communicate with middleware, such as middleware 120, to manage applications 106 and to manage runtime settings of applications 106. In the illustrated example, common system service 112 communicates with middleware 120 to manage application 104 and runtime settings 102. For example, middleware 120 may send requests to common system service 112 to at least one of register application 104, de-register application 104, save runtime settings 102 and updates to runtime settings 102, retrieving runtime settings 102, subscribe application 104 to notifications about changes to runtime settings 102. The requests sent from middleware 120 may also include requests to store instructions 116, update instructions 116, retrieve instructions 116, subscribe middleware 120 to notifications about changes to runtime settings 102, subscribe middleware 120 to notifications about changes to instructions 116, or other suitable types of middleware requests in application management environment 100.

In the illustrative example, middleware 120 is software running on a computer. In this illustrated example, middleware 120 is running on server 122 in group of servers 124 in data center 126 in application management environment 100. Server 122 is a computer configured to serve client computers. Group of servers 124 may be any combination of clusters of computers, virtual computers, and other suitable types of devices.

In the illustrated example, data center 126 is at least one of a cloud computing center, an enterprise data warehouse, an internet web site, or any other suitable type or combination of types of computing centers for consumers of common system service 112 and providers 128 of applications 106. In this illustrated example, providers 128 of applications 106 are at least of one owners, operators, or managers of one or more applications in applications 106. For example, as a manager, operator, or owner of application 104 a provider in provider 128 may have authorization to manage at least one of application 104, runtime settings 102, or both application 104 and runtime settings 102.

As depicted, middleware 120 may send and receive runtime settings 102 to and from providers 128 in server 122. Middleware 120 may also send and receive instructions 116 to and from providers 128 in server 122. For example, middleware 120 may manage and communicate requests, responses, and notifications communicated between providers 128 and common system service 112.

The illustration of application management environment 100 in FIG. 1 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, runtime settings repository 114 may be implemented in memory of computer 108. As another example, common system service 112 may be implemented in middleware 120. As still another example, runtime settings repository 114, application management instruction storage 118, and common system service 112 may be combined into one software program or database.

In some illustrative examples, additional groups of servers in addition to group of servers 124 in data center 126 may be present within application management environment 100. For example, another group of servers other than group of servers 124 may be located in another data center other than data center 126. In this example, middleware 120 may determine which group of servers to manage runtime settings 102 and manage application 104.

Also, although components of application management environment 100 are shown as separate blocks in application management environment 100, all or a portion of these may also be implemented in computers 110, group of servers 124, or other suitable components in application management environment 100. In these illustrative examples, application management environment 100 may be implemented by any combination of hardware and software products, and may also be implemented in one or more computer systems or a cluster of computer systems.

Figure 2:
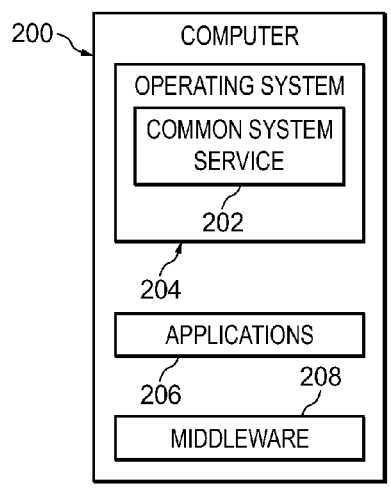
FIG. 2 is a block diagram of software components of a data processing system for managing applications in accordance with an illustrative embodiment.

With reference next to FIG. 2, a block diagram of software components of a data processing system for managing applications is depicted in accordance with an illustrative embodiment. Computer 200 is an illustrative example of computer 108 in FIG. 1. Common system service 202 is an illustrative example of common system service 112 in FIG. 1.

In this illustrative example, common system service 202 is located in operating system 204 of computer 200. For example, common system service 202 may be a program module of operating system 204. In the illustrative example, common system service 202 may operate as a portion of the kernel of operating system 204. Further in this illustrative example, common system service 202 may operate at a ring level of the operating system that is kept separate and secure from another ring level of applications 206 and middleware 208 running on operating system 204 in computer 200. As used herein, a program module of operating system 204 may be at least one of an installed extension to operating system 204 and part of operating system 204 that comes with operating system 204.

In this illustrative example, applications 206 is an example of applications 106 in FIG. 1. Middleware 208 is an example of middleware 120 in FIG. 1. In the illustrative example, applications 206 and middleware 208 use common system service 202 in operating system 204 in at least one of a process for managing applications 206 and a process for managing runtime settings of applications 206.

Figure 3:
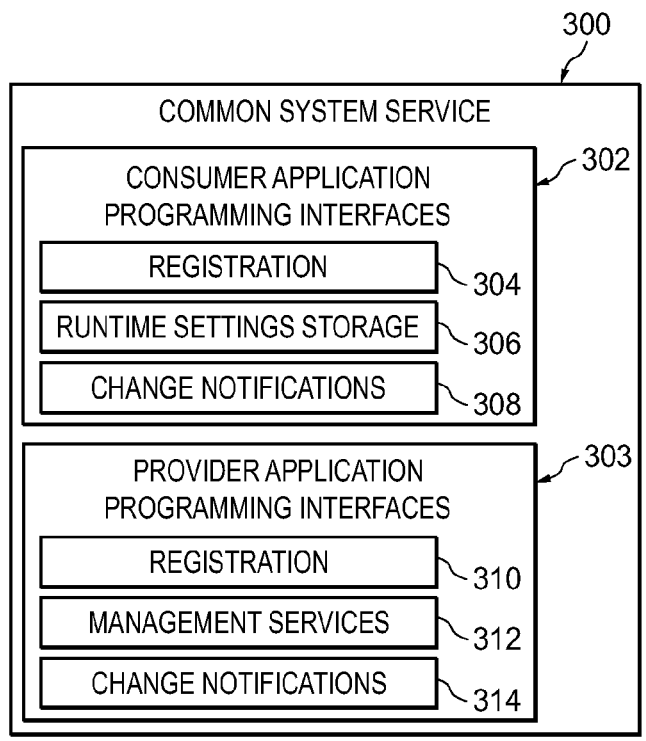
FIG. 3 is a block diagram of application programming interfaces of a common system service for managing applications in accordance with an illustrative embodiment.

Turning next to FIG. 3, a block diagram of application programming interfaces of a common system service for managing applications is depicted in accordance with an illustrative embodiment. In this illustrative example, common system service 300 is an example of common system service 112 in FIG. 1. As depicted, one or both of consumer application programming interfaces 302 and provider application programming interfaces may be located in common system service 300.

Consumer application programming interfaces 302 include registration 304, runtime settings storage 306, and change notifications 308. In this illustrative example, registration 304 interface registers consumers with common system service 300, runtime settings storage 306 interface manages runtime settings of applications, and change notifications 308 interface manages notifications sent to consumers about runtime settings changes.

Provider application programming interfaces 303 include registration 310, management services 312, and change notifications 314. In this illustrative example, registration 310 interface registers providers with common system service 300, management services 312 interface manages applications, and change notifications 314 interface manages notifications sent to providers about runtime settings changes and instruction changes.

In the illustrative example, runtime settings are communicated through consumer application programming interfaces 302 and provider application programming interfaces 303. Runtime settings communicated through common system service 300 interfaces may have a format selected for the application based on what type of application the application is. The type of the application is a phrase or word that describes what the application does. For example, when runtime settings are for a particular type of networking application the runtime settings may be in a format standardized for the particular type of networking application. Runtime settings communicated through common system service 300 interfaces may also have a format selected based on the type of settings being used. For example, an office application may include some runtime settings for communicating between other office applications. In this example, the format for these runtime settings may be in a common format for application to application communications. As used herein, a common format for runtime settings of an application may be selected based on at least one of a type of application, a type of settings, or a combination of the type of application and the type of settings. The common format may be in xml, html, resource description format (RDF), or other suitable standards for specifying runtime settings of applications.

When applications communicate runtime settings with common system service 300, the format of the runtime settings communicated through common system service 300 may be different than the format of the settings stored in configuration files of the applications. For example, a first application may have a first proprietary format for settings stored in a configuration file of the application and a second standard format for runtime settings communicated through interfaces of common system service 300. As another example, a first application may have a first standard format for settings stored in a configuration file of the first application and a second application may have a second standard format for settings stored in a configuration file of the first application. In this example, the first and second application may use a common format for communicating runtime settings through interfaces of common system service 300.

Figure 4:
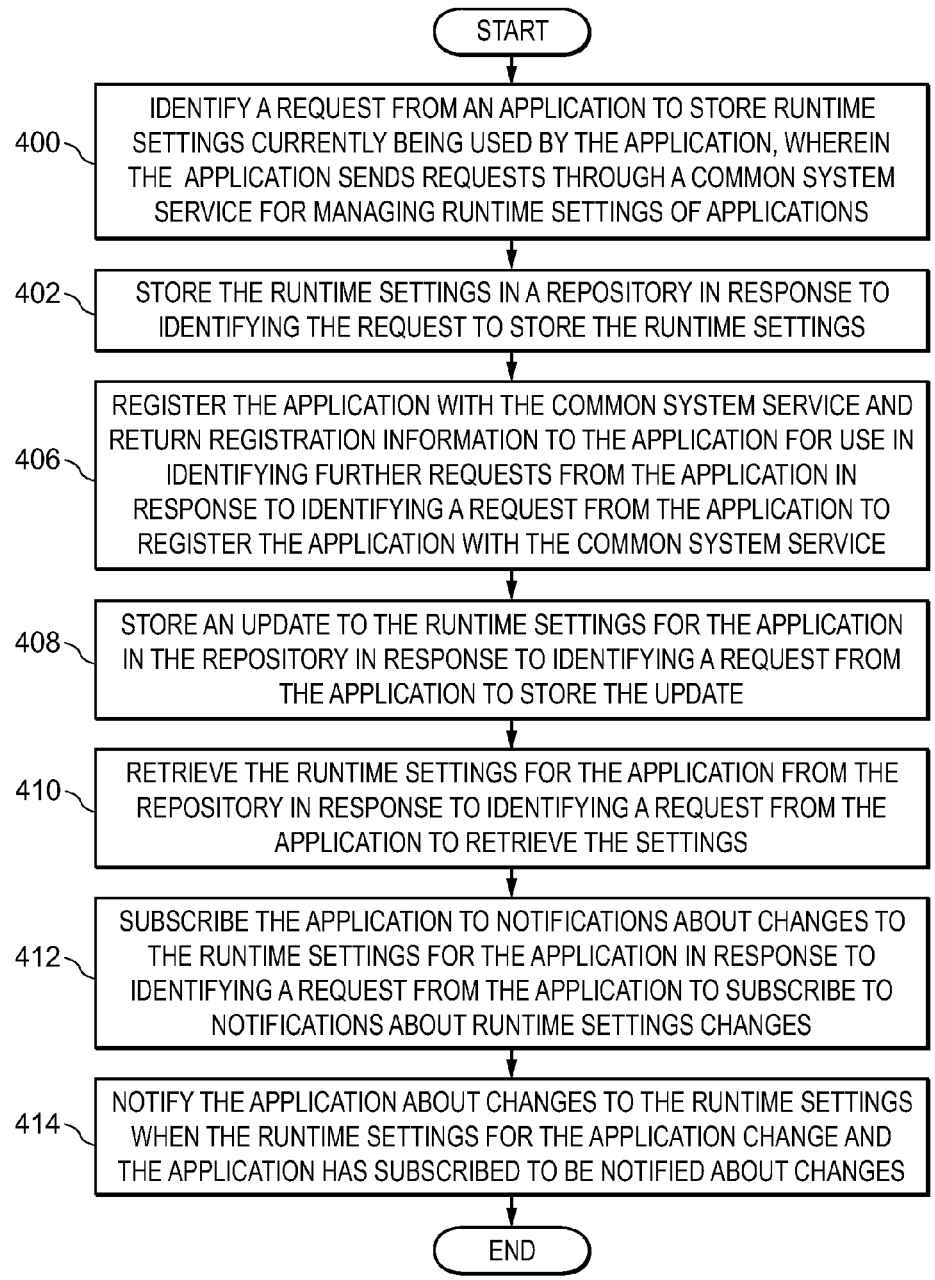
FIG. 4 is a flowchart of a process for managing settings of applications in accordance with an illustrative embodiment.

Turning next to FIG. 4, a flowchart of a process for managing settings of applications is depicted in accordance with an illustrative embodiment. The steps illustrated in FIG. 4 are examples of steps that may be used to manage runtime settings 102 of application 104 in FIG. 1. These steps may be implemented in common system service 112 in FIG. 1, runtime settings repository 114 in FIG. 1, computer 108 in FIG. 1, and in other data processing systems in FIG. 1.

The process begins by identifying a request from an application to store runtime settings currently being used by the application (step 400). As depicted, the application sends the request through a common system service for managing runtime settings of applications. The runtime settings currently being used by the application in step 400 is an example of runtime settings 102 of application 104. The common system service for managing runtime settings of applications in step 400 is an example of common system service 112.

In response to identifying the request to store the runtime settings, the process next stores the runtime settings in a repository (step 402). The repository in step 402 is an example of runtime settings repository 114 in FIG. 1.

As depicted, the process may also identify another request from the application to one or more of register the application with the common system service (step 406), save updates to the runtime settings for the application (step 408), retrieve the runtime settings for the application (step 410), and subscribe the application to notifications about changes to the runtime settings (step 412). The process then notifies the application about changes to runtime settings when the runtime settings for the application change and the application has subscribed to be notified about changes (step 414), with the process terminating thereafter. For example, the process in step 414 may be in response to a provider of the application providing an update to the runtime settings for the application.

The process in FIG. 4 may be repeated any number of times. For example, two or more applications may share runtime settings. In this example, each application may subscribe to notifications about changes to the shared runtime settings. Responsive a first application of the two or more applications saving or updating shared runtime settings, a second application of the two or more applications is notified about the changes, with the notification including the changes made to the runtime settings by the first application.

Figure 5:
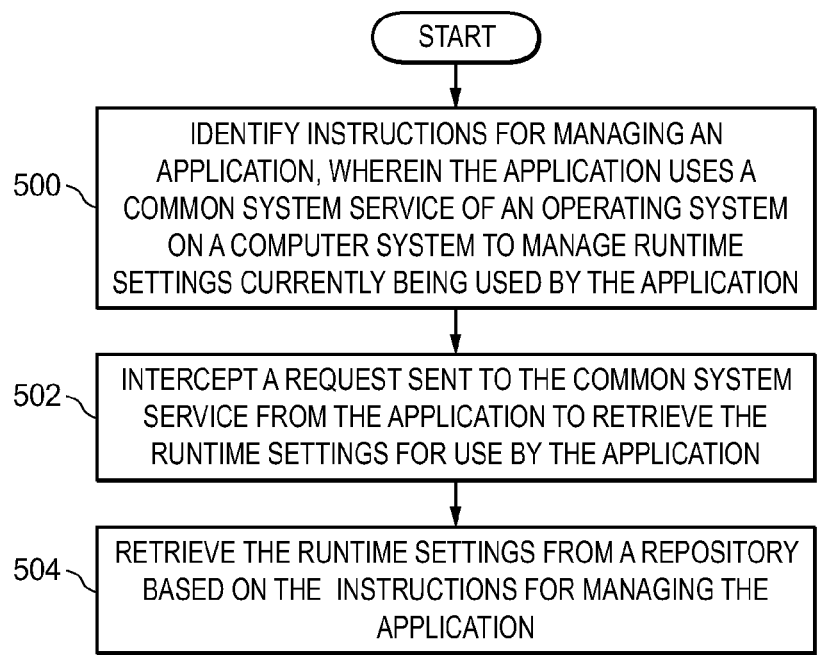
FIG. 5 is a flowchart of a process for managing applications in accordance with an illustrative embodiment.

Turning further to FIG. 5, a flowchart of a process for managing applications is depicted in accordance with an illustrative embodiment. The steps illustrated in FIG. 5 are examples of steps that may be used to manage application 104 in FIG. 1. These steps may be implemented in common system service 112 in FIG. 1, middleware 120 in FIG. 1, runtime settings repository 114 in FIG. 1, application management instruction storage 118 in FIG. 1, computer 108 in FIG. 1, and in other data processing systems in FIG. 1.

The process begins by identifying instructions for managing an application (step 500). As depicted, the application uses a common system service of an operating system on a computer system to managing runtime settings currently being used by the application. The runtime settings currently being used by the application in step 500 is an example of runtime settings 102 of application 104. The common system service for managing runtime settings of applications in step 500 is an example of common system service 112. The identified instructions are an example of instructions 116 in FIG. 1.

The process next intercepts a request sent to the common system service from the application to retrieve the runtime settings for use by the application (step 502). The process then retrieves the runtime settings from a repository based on the instructions for managing the application (step 504), with the process terminating thereafter. For example, the process in step 504 may be in response to instructions from middleware 120 allowing the application to retrieve the runtime settings when the application has registered with the common system service to use the common system service to manage the runtimes settings of the application.

Figure 6:
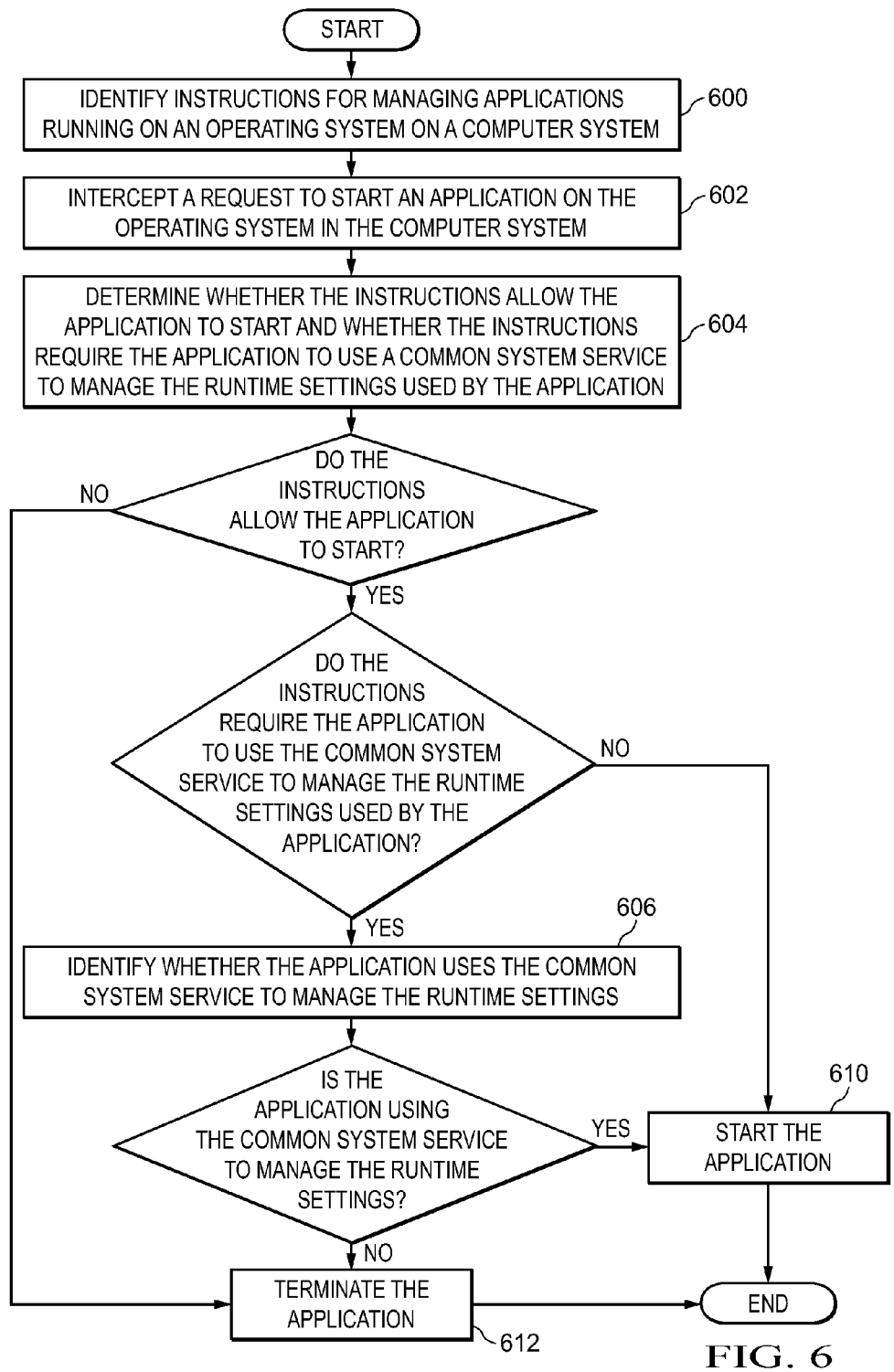
FIG. 6 is a flowchart of a process for managing applications in accordance with an illustrative embodiment.

Turning still further to FIG. 6, a flowchart of a process for managing applications is depicted in accordance with an illustrative embodiment. The steps illustrated in FIG. 6 are examples of steps that may be used to manage application 104 in FIG. 1. These steps may be implemented in common system service 112 in FIG. 1, middleware 120 in FIG. 1, runtime settings repository 114 in FIG. 1, application management instruction storage 118 in FIG. 1, computer 108 in FIG. 1, and in other data processing systems in FIG. 1.

The process begins by identifying instructions for managing applications running on an operating system on a computer system (step 600). The identified instructions are an example of instructions 116 in FIG. 1. The applications are an example of applications 206 in FIG. 2. The operating system on the computer system is an example of operating system 204 on computer 200 in FIG. 2.

As depicted, the process next intercepts a request to start an application on the operating system in the computer system (step 602). The process determines whether the instructions allow the application to start and whether the instructions require the application use a common system service to manage the runtime settings use by the application (step 604). If the instructions allow the application to start and do not require the application use the common system service, the process starts the application (step 610), with the process terminating thereafter.

As depicted when the instructions allow the application to start if the application is using the common system service to manage the runtime settings of the application, the process next identifies whether the application uses the common system service to manage the runtime settings of the application (step 606). When the application is using the common system service to manage the runtime settings as per the identified instructions, the process then starts the application (step 610), with the process terminating thereafter.

When the instructions do not allow the application to start, or when the instructions allow the application to start but the application is not using the common system service to manage the runtime settings as per the identified instructions, the process then terminates the application (step 612), with the process terminating thereafter.

The process in FIG. 6 may be repeated any number of times. For example, providers of the applications in step 600 may provide changes to the instructions in step 600. In this example, the providers may provide instructions to stop one or more of the applications from running. The providers of the applications may also provide instructions to restart terminated applications. The providers of the applications may further provide instructions to allow applications to run without requiring the applications use the common system service to manage runtime settings.

Turning now to FIG. 7, an illustration of a data processing system is depicted in accordance with an illustrative embodiment. Data processing system 700 is an example of a data processing system that may be used to implement common system service 112 in FIG. 1, middleware 120 in FIG. 1, runtime settings repository 114 in FIG. 1, application management instruction storage 118 in FIG. 1, computer 108 in FIG. 1, and in other data processing systems in FIG. 1. In this illustrative example, data processing system 700 includes communications framework 702, which provides communications between processor unit 704, memory 706, persistent storage 708, communications unit 710, input/output (I/O) unit 712, and display 714. In these examples, communications frame work 702 may be a bus system.

Processor unit 704 serves to execute instructions for software that may be loaded into memory 706. Processor unit 704 may be a number of processors, a multi-processor core, or some other type of processor, depending on the particular implementation. A number, as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type. A group of processors or processor units is one of more processors that may be located on a same computer or on different computers. In other words, the group of processors could be distributed in different locations.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications framework 702. In these illustrative examples, the instructions are in a functional form on persistent storage 708. These instructions may be loaded into memory 706 for execution by processor unit 704. The processes of the different embodiments may be performed by processor unit 704 using computer implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724. Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700. In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is a media that can be touched by a person.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations. For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 718 may be omitted because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications framework 702 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 706, or a cache, such as found in an interface and memory controller hub that may be present in communications framework 702.

Thus, the illustrative embodiments provide a method, apparatus, and computer program product for managing settings of applications is disclosed. In some examples, a program identifies a request from an application to store runtime settings currently being used by the application. In these examples, the program then stores the runtime settings in a repository in response to identifying the request. In one or more examples, the application is running on an operating system on a computer system, and the request is communicated through a common system service of the operating system. In these and other examples, program may also comprise steps for identifying another request from the application to one or more of register the application with the common system service, save updates to the runtime settings for the application, retrieve the runtime settings for the application, and subscribe the application to notifications about changes to the runtime settings. In these examples, the program may notify the application about changes to runtime settings when the runtime settings for the application change and the application has subscribed to be notified about changes.

By using a common system service to manage runtime settings of applications the runtime settings of the applications can be consumed more efficiently and with less human error. When the common system service is tightly integrated with an operating system, the common system service is able to manage process initiation and termination of running applications. This common system service may manage requirements of the applications to register with the common system service, and if they don't they are terminated. By registering with the common system service, a repository of runtime settings of applications can be created, and monitored.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing settings of applications, the method comprising:

identifying, by a group of processors, a request, from an application to a common system service using an application programming interface, as a specific request to store runtime settings currently being used by the application, wherein the common system service processes requests, in an application management environment, from the application, selected from a group of requests consisting of, register the application, de-register the application, save the runtime settings and updates to the runtime settings, retrieve the runtime settings, and subscribe to notifications about changes to the runtime settings, and wherein the application is running on an operating system on a computer system, and wherein the request is communicated through the common system service of the operating system and wherein the common system service is included in a programming module installed in the operating system, and wherein the application sent the request to the common system service using an application programming interface of the programming module, and wherein the application programming interface is one of a consumer application programming interface that includes a registration interface, a runtime settings storage interface, and a change notifications interface and a provider application programming interface that includes a registration interface, a management interface, and a change notifications interface, and wherein the request is a first request, and further comprising identifying, by the group of processors, a second request, from the application, to manage the runtime settings currently being used by the application, and wherein the application registers with the common system service to use the common system service to manage the runtimes settings of the application, and wherein the second request includes requests selected from the group of requests consisting of registering the application, de-registering the application, saving an update to the runtime settings for the application, retrieving the runtime settings for the application, and subscribing to notifications about changes to the runtime settings for the application, and wherein the common system service processes the second request; and storing, by the group of processors, the runtime settings currently being used by the application in a repository associated with the common system service in response to identifying the request as the specific request to store the runtime settings.

2. The method of claim 1, further comprising:

identifying, by the group of processors, instructions for managing the application.

3. The method of claim 2, wherein the computer system is a first computer system, the instructions are from middleware, the middleware is in communication with a second computer system, and the communication includes the runtime settings.

4. The method of claim 2, wherein the instructions include one or more of determining whether the application is using the common system service to manage the runtime settings being used by the application, terminating the application in response to determining the application is not using the common system service to manage the runtime settings being used by the application, starting the application in response to determining the application is using the common system service to manage the runtime settings being used by the application, and subscribing to notifications about changes to the runtime settings being used by the application.

5. The method of claim 1, wherein the application is a first type of application, and wherein the runtime settings currently being used by the application is in a common format for the first type of application.

* * * * *